United States Patent
Menachem et al.

(10) Patent No.: US 10,031,857 B2
(45) Date of Patent: Jul. 24, 2018

(54) ADDRESS TRANSLATION SERVICES FOR DIRECT ACCESSING OF LOCAL MEMORY OVER A NETWORK FABRIC

(71) Applicant: MELLANOX TECHNOLOGIES LTD., Yokneam (IL)

(72) Inventors: Adi Menachem, Hod Hasharon (IL); Shlomo Raikin, Kibbutz Yassur (IL); Idan Burstein, Karmiel (IL); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 280 days.

(21) Appl. No.: 14/953,462

(22) Filed: Nov. 30, 2015

(65) Prior Publication Data

US 2016/0077976 A1 Mar. 17, 2016

Related U.S. Application Data

(63) Continuation-in-part of application No. 14/721,009, filed on May 26, 2015.
(Continued)

(51) Int. Cl.
*G06F 13/36* (2006.01)
*G06F 12/1009* (2016.01)
(Continued)

(52) U.S. Cl.
CPC ...... *G06F 12/1009* (2013.01); *G06F 12/1027* (2013.01); *G06F 13/28* (2013.01); *G06F 13/385* (2013.01); *G06F 2212/657* (2013.01)

(58) Field of Classification Search
USPC ................... 710/104–110, 305–317
See application file for complete search history.

(56) References Cited

U.S. PATENT DOCUMENTS 5,822,749 A 10/1998 Agarwal
5,845,329 A 12/1998 Onishi et al.
(Continued)

OTHER PUBLICATIONS

"Linux kernel enable the IOMMU—input/output memory management unit support" , 2 pages, Oct. 15, 2007 http://www.cyberciti.biz/tips/howto-turn-on-linux-software-iommu-support.html.
(Continued)

*Primary Examiner* — Raymond Phan
(74) *Attorney, Agent, or Firm* — D. Kligler IP Services Ltd.

(57) ABSTRACT

A method in a system that includes first and second devices that communicate with one another over a fabric that operates in accordance with a fabric address space, and in which the second device accesses a local memory via a local connection and not over the fabric, includes sending from the first device to a translation agent (TA) a translation request that specifies an untranslated address in an address space according to which the first device operates, for directly accessing the local memory of the second device. A translation response that specifies a respective translated address in the fabric address space, which the first device is to use instead of the untranslated address is received by the first device. The local memory of the second device is directly accessed by the first device over the fabric by converting the untranslated address to the translated address.

18 Claims, 7 Drawing Sheets

Related U.S. Application Data

(60) Provisional application No. 62/003,089, filed on May 27, 2014.

(51) Int. Cl.
*G06F 12/1027* (2016.01)
*G06F 13/38* (2006.01)
*G06F 13/28* (2006.01)

(56) References Cited

U.S. PATENT DOCUMENTS

| | | |
|---|---|---|
| 6,321,276 B1 | 11/2001 | Forin |
| 6,629,166 B1 | 9/2003 | Grun |
| 6,766,467 B1 | 7/2004 | Neal et al. |
| 6,789,143 B2 | 9/2004 | Craddock et al. |
| 6,981,027 B1 | 12/2005 | Gallo et al. |
| 7,171,484 B1 | 1/2007 | Krause et al. |
| 7,225,287 B2 | 5/2007 | Wooten |
| 7,263,103 B2 | 8/2007 | Kagan et al. |
| 7,299,266 B2 | 11/2007 | Boyd et al. |
| 7,464,198 B2 | 12/2008 | Martinez et al. |
| 7,475,398 B2 | 1/2009 | Nunoe |
| 7,548,999 B2 | 6/2009 | Haertel et al. |
| 7,623,134 B1 | 11/2009 | Danilak |
| 7,663,635 B2 | 2/2010 | Rogers et al. |
| 7,721,068 B2 | 5/2010 | Lowe et al. |
| 7,752,417 B2 | 7/2010 | Manczak et al. |
| 7,809,923 B2 | 10/2010 | Hummel et al. |
| 7,844,746 B2 | 11/2010 | Arimilli et al. |
| 8,001,592 B2 | 8/2011 | Hatakeyama |
| 8,010,763 B2 | 8/2011 | Armstrong et al. |
| 8,051,212 B2 | 11/2011 | Kagan et al. |
| 8,086,765 B2 | 12/2011 | Turner et al. |
| 8,249,089 B2 | 8/2012 | Saripalli |
| 8,255,475 B2 | 8/2012 | Kagan et al. |
| 8,364,910 B2 | 1/2013 | Wilkerson et al. |
| 8,447,904 B2 | 5/2013 | Riddoch |
| 8,578,129 B2 | 11/2013 | Blinzer et al. |
| 8,593,472 B1 | 11/2013 | Diard |
| 8,645,663 B2 | 2/2014 | Kagan et al. |
| 8,650,342 B2 | 2/2014 | Brahmaroutu |
| 8,711,418 B2 | 4/2014 | Cho |
| 8,745,276 B2 | 6/2014 | Bloch et al. |
| 8,914,458 B2 | 12/2014 | Raindel et al. |
| 9,043,513 B2 | 5/2015 | Perego et al. |
| 2002/0152327 A1 | 10/2002 | Kagan et al. |
| 2003/0046530 A1 | 3/2003 | Poznanovic |
| 2004/0107304 A1 | 6/2004 | Grun |
| 2004/0221128 A1 | 11/2004 | Beecroft et al. |
| 2004/0230979 A1 | 11/2004 | Beecroft et al. |
| 2007/0011429 A1 | 1/2007 | Sangili et al. |
| 2007/0061492 A1 | 3/2007 | Van Riel |
| 2007/0157001 A1 | 7/2007 | Ritzau |
| 2007/0157011 A1 | 7/2007 | Kumar et al. |
| 2008/0005495 A1 | 1/2008 | Lowe et al. |
| 2008/0126509 A1 | 5/2008 | Subramanian et al. |
| 2008/0133709 A1 | 6/2008 | Aloni et al. |
| 2008/0222397 A1 | 9/2008 | Wilkerson et al. |
| 2009/0138574 A1 | 5/2009 | Hui et al. |
| 2010/0077397 A1 | 3/2010 | Ooi et al. |
| 2010/0095085 A1 | 4/2010 | Hummel et al. |
| 2010/0223262 A1 | 9/2010 | Krylov et al. |
| 2011/0023027 A1 | 1/2011 | Kegel et al. |
| 2011/0173396 A1 | 7/2011 | Sugumar et al. |
| 2012/0317122 A1 | 12/2012 | Baptist et al. |
| 2012/0331243 A1 | 12/2012 | Aho et al. |
| 2013/0145085 A1 | 6/2013 | Yu et al. |
| 2013/0166922 A1 | 6/2013 | Wong et al. |
| 2013/0311746 A1 | 11/2013 | Raindel et al. |
| 2014/0055467 A1 | 2/2014 | Bittner et al. |
| 2014/0008945 A1 | 3/2014 | Eran et al. |
| 2014/0075060 A1 | 3/2014 | Sharp et al. |
| 2014/0122828 A1 | 5/2014 | Kagan et al. |
| 2014/0164716 A1 | 6/2014 | Glasco et al. |
| 2014/0204102 A1* | 7/2014 | Rath ............... G06T 1/20 345/522 |
| 2015/0042664 A1* | 2/2015 | Currid ............. G06T 1/20 345/502 |
| 2015/0058533 A1* | 2/2015 | El-Batal ........... G06F 13/385 711/103 |
| 2015/0074322 A1* | 3/2015 | Galles ............. H04L 29/12367 710/313 |
| 2015/0261434 A1 | 9/2015 | Kagen et al. |
| 2015/0261720 A1 | 9/2015 | Kagen et al. |
| 2015/0347349 A1 | 12/2015 | Raindel et al. |

OTHER PUBLICATIONS

"MPI: A Message-Passing Interface Standard", Version 2.2, Message Passing Interface Forum, 647 pages, Sep. 4, 2009.

Infiniband Trade Association, "InfiniBandTM Architecture Specification", vol. 1, Release 1.2.1, 1727 pages, Nov. 2007.

Shah et al., "Direct Data Placement over Reliable Transports", IETF Network Working Group, RFC 5041, 38 pages, Oct. 2007.

Culley et al., "Marker PDU Aligned Framing for TCP Specification", IETF Network Working Group, RFC 5044, 74 pages, Oct. 2007.

Solomon R., "IOV 1.1 Update and Overview", LSI Corporation, Member I/O Virtualization Workgroup, PCI-SIG, PCI Express, 45 pages, 2010.

Hummel M., "IO Memory Management Hardware Goes Mainstream", AMD Fellow, Computation Products Group, Microsoft WinHEC, 7 pages, 2006.

Welsh et al., "Incorporating Memory Management into User-Level Network Interfaces", Department of Computer Science, Cornell University, Technical Report TR97-1620, 10 pages, Feb. 13, 1997.

Kraus, J., "Introduction to CUDA-aware MPI and NVIDIA GPUDirect™", 40 pages, Mar. 18, 2013.

An EaseUS.COM article "How iSCSI Works", 1 page, 2007 (http://www.easeus.com/resource/drive/iscsi-drive.htm).

Shainer, G., "Interconnect Your Future", 2nd Annual MVAPICH User Group (MUG) Meeting, 28 pages, Aug. 2014.

PCI Express® Base Specification, Revision 3.0, 860 pages, Nov. 10, 2010.

Nvidia Corporation, "Nvidia GPUDirect", 5 pages, year 2014.

PCI Express® specifications., "Address Translation Services", revision 1.1, 54 pages, Jan. 26, 2009.

* cited by examiner

ADDRESS TRANSLATION SERVICES FOR DIRECT ACCESSING OF LOCAL MEMORY OVER A NETWORK FABRIC

CROSS-REFERENCE TO RELATED APPLICATIONS

This application is a continuation-in-part of U.S. patent application Ser. No. 14/721,009, filed May 26, 2015, which claims the benefit of U.S. Provisional Patent Application 62/003,089, filed May 27, 2014. The disclosures of these related applications are incorporated herein by reference.

FIELD OF THE INVENTION

The present invention relates generally to computer systems, and particularly to methods and systems for direct accessing the local memory of a peripheral device over a network fabric using address translation services.

BACKGROUND OF THE INVENTION

In various computer systems, peripheral devices communicate over a network fabric such as a PCI or PCI-Express (PCIe) bus. Such peripheral devices may include, for example, a solid state drive (SSD) and various accelerator modules such as a graphics processing unit (GPU). Methods for directly accessing a local memory of a device are known in the art. For example, U.S. Pat. No. 7,623,134, whose disclosure is incorporated herein by reference, describes a technique for processing address page requests in a GPU system that is implementing a virtual memory model. A hardware-based page fault manager included in the GPU system intercepts page faults otherwise processed by a software-based page fault manager executing on a host CPU. The hardware-based page fault manager in the GPU includes a DMA engine capable of reading and writing pages between the system memory and a frame buffer memory in the GPU without involving the CPU or operating system.

As another example, U.S. Patent Application Publication 2014/0055467, whose disclosure is incorporated herein by reference, describes a system that may include a Graphics Processing Unit (GPU) and a Field Programmable Gate Array (FPGA). The system may further include a bus interface that is external to the FPGA, and that is configured to transfer data directly between the GPU and the FPGA without storing the data in a memory of a central processing unit (CPU) as an intermediary operation.

U.S. Patent Application Publication 2014/0075060, whose disclosure is incorporated herein by reference, proposes techniques for demand paging for an IO device (e.g., a GPU) that utilize pre-fetch and pre-back notification event signaling to reduce latency associated with demand paging. Page faults are limited by performing the demand paging operations prior to the IO device actually requesting unbacked memory.

Technologies that enable direct communication between remote GPUs include, for example, PeerDirect® and GPU-Direct® RDMA, as presented, for example in a presentation titled "Interconnect Your Future," by Gilad Shainer, at the 2nd Annual MVAPICH User Group (MUG) Meeting, August, 2014, whose disclosure is incorporated herein by reference.

In some applications, a PCIe device operates in accordance with an internal address space that is different from the PCIe address space, and therefore requires address translation between the two address spaces. A protocol that defines transactions for address translation services is specified, for example, in an extension to the PCIe specifications, titled "Address Translation Services," revision 1.1, Jan. 26, 2009, whose disclosure is incorporated herein by reference.

Methods for memory management including address translation are known in the art. For example, U.S. Pat. No. 7,225,287, whose disclosure is incorporated herein by reference, describes a system for addressing bus components comprising a bus controller component that controls access between a CPU and a memory address space. A plurality of bus components connected to the bus controller over a bus, are addressable via a memory mapped address within the address space. An address translation table is stored on at least one of the plurality of bus components. The bus translation table stores a translation between a virtual address and a real address.

As another example, U.S. Pat. No. 8,650,342, whose disclosure is incorporated herein by reference, describes virtualization of I/O devices to support operation of plural virtual machines on a host information handling system. The virtualization is managed with distributed translation agents that translate addresses generated from I/O devices according to mapping defined by a virtual machine monitor. The translation agents reside in the host I/O subsystem, such as at I/O hubs or at I/O devices. A discovery module discovers and configures plural translation agents to coordinate I/O device communications with translation of physical memory addresses and virtual I/O addresses.

SUMMARY OF THE INVENTION

An embodiment that is described herein provides a method in a system that includes a first device and a second device that communicate with one another over a fabric operating in accordance with a fabric address space, and in which the second device accesses a local memory via a local connection and not over the fabric including. The method includes sending from the first device to a translation agent (TA) a translation request that specifies an untranslated address in an address space according to which the first device operates, for directly accessing the local memory of the second device. A translation response from the TA that specifies a respective translated address in the fabric address space, which the first device is to use instead of the untranslated address to access the local memory, is received by the first device. The local memory of the second device is directly accessed by the first device over the fabric by converting the untranslated address to the translated address.

In some embodiments, the local memory is separate from and independent of a system memory that is coupled, directly or indirectly, to the fabric. In other embodiments, sending the translation request, receiving the translation response and accessing the local memory are performed independently of a Central Processing Unit (CPU) that is coupled, directly or indirectly, to the fabric.

In an embodiment, receiving the translation response includes caching an association between the untranslated address and the respective translated address in a mapping table of the first device, and accessing the local memory includes retrieving the translated address from the mapping table. In another embodiment, the method includes sending, by the first device to the TA, a page request that indicates a given address that has no corresponding entry in the mapping table for translation, and receiving, by the first device, a respective page response sent by the TA, that indicates that an address in the local memory corresponding to the given address is accessible.

In yet another embodiment, the method includes receiving, by the first device, an invalidation request sent by the TA, indicating an invalid entry in the mapping table that should no longer be used for address translation, and eliminating the indicated entry from the mapping table. In yet further another embodiment, the method includes sending by the first device an invalidation response to the TA, indicating that all fabric transactions related to the eliminated entry have been completed.

In some embodiments, the TA is implemented in the second device, and sending the translation request and receiving the translation response are carried out by peer-to-peer communication between the first device and the second device. In other embodiments, the TA is implemented in a TA module that connects to the fabric via a root complex interface, sending the translation request includes routing the translation request from the first device over the fabric and via the root complex interface to the TA, and receiving the translation response includes routing the translation response via the root complex interface and over the fabric to the first device.

There is additionally provided, in accordance with an embodiment that is described herein, an apparatus that includes a first device and a second device, configured to communicate with one another over a fabric that operates in accordance with a fabric address space. The second device is configured to access a local memory via a local connection and not over the fabric. The first device is configured to send to a translation agent (TA) a translation request that specifies an untranslated address in an address space according to which the first device operates, for directly accessing the local memory of the second device, to receive from the TA a translation response that specifies a respective translated address in the fabric address space, which the first device is to use instead of the untranslated address to access the local memory, and to directly access the local memory of the second device over the fabric by converting the untranslated address to the translated address.

The present invention will be more fully understood from the following detailed description of the embodiments thereof, taken together with the drawings in which:

DETAILED DESCRIPTION OF EMBODIMENTS

Overview

Figure 1:
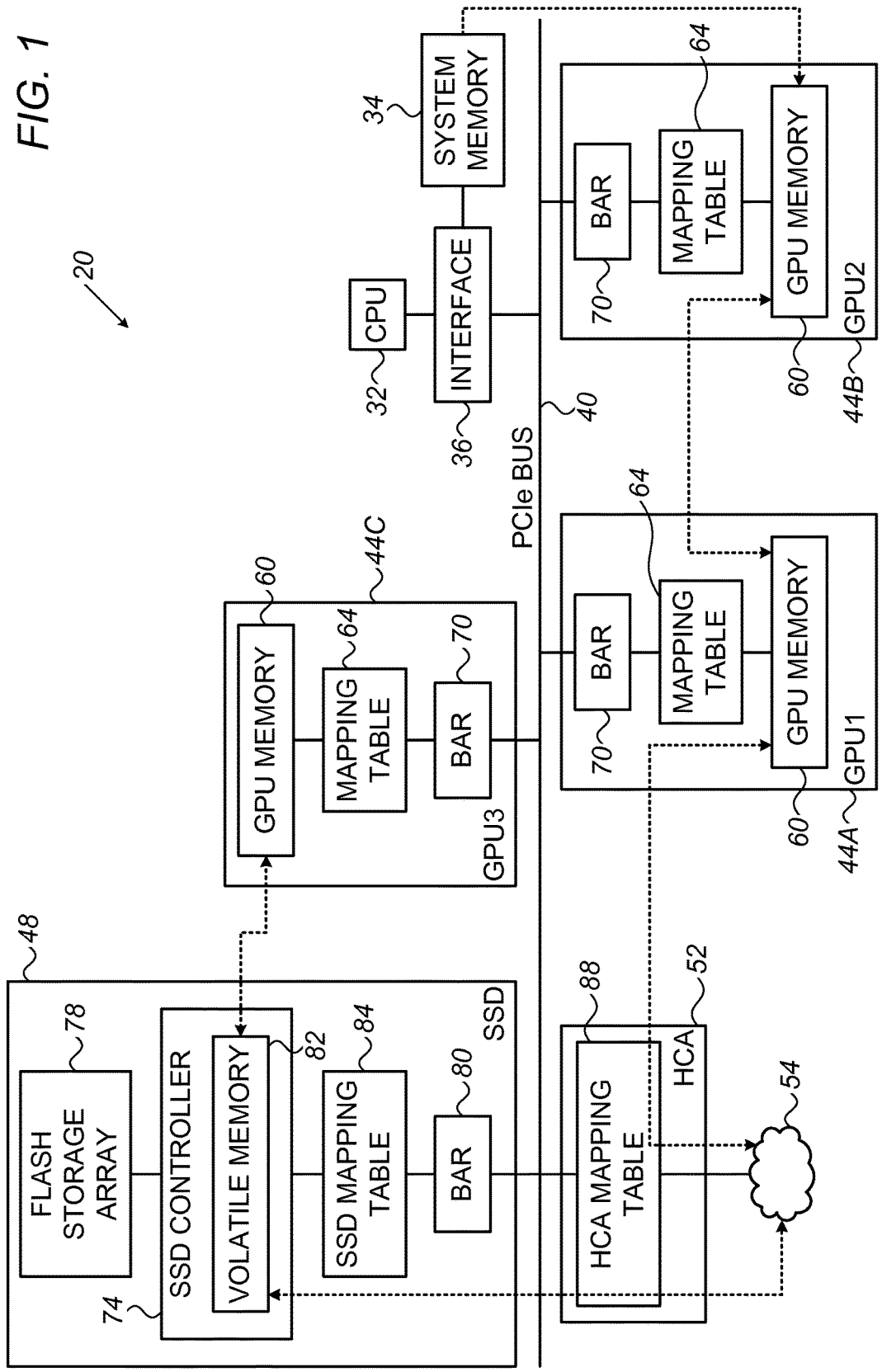
FIG. 1 is a block diagram that schematically illustrates a computer system having multiple devices communicating via PCIe, in accordance with an embodiment that is described herein.

Various computing systems comprise a central processing unit (CPU) and multiple peripheral devices that interconnect using a bus or other network fabric. The description that follows refers mainly to a PCIe bus, which is a type of a switched fabric, but the disclosed techniques apply to other interconnect configurations such as PCI, AXI, NVLINK, AMBA, HyperTransport and QPI. Embodiments of the present invention that are described herein provide improved methods and systems for accessing the local memory of a device over PCIe and other suitable bus or network fabric types. In the context of the present disclosure, the term "direct access" means that data can be transferred between devices, over PCIe, with no involvement of the software running on the CPU in the data plane. Devices interconnecting via PCIe are referred to herein as PCIe devices.

In accordance with the PCIe specifications, PCIe devices can communicate using a common address space that is associated with the fabric to which they connect. This address space is referred to herein as a fabric address space or PCIe address space. In some embodiments, PCIe devices use addresses in an internal address space that may be different from the fabric address space. In the context of the present disclosure and in the claims, a network fabric (e.g., a PCIe based fabric) that operates in accordance with a respective fabric address space can route messages over the fabric based on address information as well as other routing information such as ID of the source device, destination device or both. In the description that follows, a PCIe based fabric is also referred to as a PCIe bus.

The PCIe specifications define a mechanism by which a PCIe device may expose its local memory (or part thereof) to the PCIe bus and thus enable the CPU or other devices attached to the PCIe bus to access its memory directly. Typically, each PCIe device is assigned a dedicated region in the PCIe address space that is referred to as a PCI base address register (BAR). In addition, addresses that the device exposes are mapped to respective addresses in the PCI BAR.

In some embodiments, the translation between addresses of the PCIe address space and the internal address space is implemented using a mapping table in the device. Alternatively or additionally, the device may carry out the translation using an input/output memory management unit (IOMMU) or an address translation service (ATS).

In some practical situations, a device is unable to expose its entire logical address space to the PCIe bus simultaneously, due to various reasons such as limitations in the BIOS and/or firmware, or due to long access times to parts of the address space. For example, in a solid state drive (SSD), to avoid blocking the PCIe bus during periods in which the SSD fetches data from the flash storage, the SSD comprises a relatively small RAM buffer that caches data stored in the flash storage, and exposes to the PCIe bus only the RAM buffer rather than the flash storage. As a result of exposing parts of the local memory, only the local memory addresses that are exposed at a given time are accessible to other devices. In the disclosed techniques, the mapping between the PCI BAR allocated to the device and the local addresses or the network visible addresses is updated dynamically so as to expose different memory locations as requested. In an embodiment, addresses that are currently not mapped to the PCIe bus are marked as invalid (or inaccessible) addresses.

In an embodiment, an HCA attempts to read data from an SSD that exposes its entire RAM buffer to the PCIe bus. When the HCA requests to read data that is not currently available in the RAM buffer, the SSD fetches the missing data to the RAM buffer and the HCA updates its mapping tables, accordingly.

In some embodiments, when accessing an address that is currently not exposed to the PCIe bus, the accessing device requests the CPU to update the related mapping tables, so as to include the required address. In other embodiments, the accessing device may send a message for updating the mapping tables directly to the peer device, without involving the CPU. Such a message may comprise, for example an ATS-PRI (Address Translation Service-Page Request Interface) message, in accordance with the PCIe specifications.

In an embodiment, the CPU updates the mapping tables in the accessing and target devices by reserving one or more additional addresses in each of the accessing and target devices, and mapping the added addresses to available physical addresses in the PCI BAR. In some embodiments, the target device does not necessarily comprise a mapping table. In such embodiments, only the mapping table in the accessing device is updated. In another embodiment, the CPU evicts one or more addresses that are currently mapped to the PCI BAR before mapping additional addresses to the PCI BAR. Updating the mapping tables can be carried out by the CPU, the devices involved or in combination of the CPU and devices. Alternatively, updating the mapping table is handled using a translation agent (TA) that provides address translation services.

In some embodiments, a PCIe device (e.g., a GPU) manages the direct access to its local memory. The device allocates a memory buffer to be accessed and maps the buffer addresses to respective addresses of the PCI BAR as described above. The device then sends a command to another device (e.g., a storage device or a network adapter) to access the memory buffer directly. When the transaction is completed, the PCIe device receives from the other device a respective indication and tears the buffer mapping down. When the other device comprises a network adapter, the PCIe device may send to the network adapter a command to update the mapping tables in the network adapter to include the PCI BAR mapped to the memory buffer.

In some embodiments, the computing system comprises a memory management unit and an address translation agent (TA). In the description that follows we assume an implementation in which the TA, in addition to providing address translation services, performs at least part of memory management tasks on behalf of the memory management unit.

In the disclosed embodiments, the CPU and system memory interconnect with one another and to the PCIe bus using an interface that is referred to as a "root complex" (RC). Consider a first device that requires direct access to the local memory of a second device. The second device accesses its local memory via an internal connection or bus and not over the PCIe bus. The TA manages the local memory of the second device and provides address translation services to the first device.

In one embodiment, the TA connects to the PCIe bus via the RC. In this architecture, the TA can manage the local memory of multiple devices. In another embodiment, the TA is connected to or is executed by the second device. In this architecture the TA manages the local memory of the second device, connects to the PCIe bus via the second device and provides address translation services to the first device.

In some embodiments, the first device and the TA communicate with one another in accordance with a protocol that defines various address translation related transactions. For example, the first device sends to the TA an address translation request that specifies an untranslated address in the address space of the first device, and the TA returns to the first device a response message that specifies the respective translated address in the PCIe address space. In some embodiments, the first device saves an association between the untranslated and translated addresses in a mapping table for subsequent efficient accessing of the local memory.

The TA may initiate an invalidation request to the first device to exclude entries in the mapping table that are no longer valid. When attempting to access the local memory of the second device using an untranslated address for which the mapping table has no associated translated address, the first device sends to the TA a page request message to reserve part of the local memory that contains the an address corresponding to the inaccessible untranslated address.

The disclosed techniques can be utilized in various applications such as direct data transfer between PCIe devices such as GPUs, remote access to the GPU memory or to a storage device via a network adapter, and the like. By dynamically exposing different parts of the device's local memory, the entire local memory can be accessed with minimal latency and low complexity.

System Description

FIG. 1 is a block diagram that schematically illustrates a computer system 20 having multiple devices communicating via PCIe, in accordance with an embodiment that is described herein. Computer system 20 comprises a CPU 32 and a system memory 34 that are interconnected using a fabric interface 36. Fabric interface 36 additionally connects CPU 32 and system memory 34 to a fabric 40 to which several peripheral devices are also connected. In some embodiments, CPU 32 runs a program such as a program that starts on system boot, an operating system or a device driver that manages the allocation of fabric 40 resources and peripheral device configuration in system 20.

In system 20, fabric 40 comprises a PCI-Express (PCIe) bus. Alternatively, fabric 40 may comprise other suitable interconnects or buses such as PCI. Peripheral devices communicating over fabric 40 are also referred to herein as PCIe devices. The PCIe bus is specified, for example, in "PCI Express® Base Specification," Revision 3.0, Nov. 10, 2010, which is incorporated herein by reference.

System 20 may comprise one or more peripheral devices that perform various tasks for the system. In the present example, the peripheral devices connecting to fabric 40 comprise multiple graphics processing units (GPUs) 44, a solid state drive (SSD) 48 and a host channel adapter (HCA) 52 that connects to a communication network 54. Alternatively, any network adapter other than HCA 52 such as a network interface controller (NIC) can also be used. In some embodiments, a peripheral device may comprise an accelerator or other co-processor that is implemented in FPGA (not shown in the figure) and is attached to the PCIe bus.

Communication over fabric 40 is carried out in accordance with a fabric address space that is also referred to herein as a physical address space or a PCIe address space. An address within the fabric address space is also referred to herein as a bus address, physical address or PCIe address. For each device on the PCIe bus a range of addresses is allocated in this physical address space. By allocating different ranges in the fabric address space per device, the PCIe devices can be addressed and accessed individually. The range of physical addresses is also referred to herein as a PCI BAR. Typically, the PCI BAR allocated to a given PCIe device is determined at initialization, e.g., by the BIOS program, and does not change over time.

In some embodiments, the PCIe device comprises a byte-addressable data storage, such as RAM or flash, which the device may expose for direct access over the PCI BAR. Usually, the device is capable of some form of mapping physical addresses of the PCIe bus to respective parts of the addressable data storage. For example, a PCIe device may use a virtual address space that is larger than the physical address space of fabric 40. Alternatively, a PCIe device may access an internal memory using an address space that is smaller than the fabric address space. Note that noncontiguous ranges in the device's address space can be mapped to a contiguous PCI BAR. When accessing the local memory of a PCIe device over fabric 40, at a memory address that is mapped to a respective physical address, the PCIe device translates this physical address to the memory address.

PCIe devices typically support one or more internal logical functions and may use an internal address space (or spaces) for the logical functions' memory accesses. For example, in an HCA, network transactions carry addresses that belong to a virtual address space and are defined by respective memory keys. This virtual address space is different from the physical address space of fabric 40. Again, various mapping mechanisms may be used to convert addresses in this virtual address space into physical addresses of the fabric when executing DMA requests.

Note that in both cases, i.e., 1) translation from physical PCIe addresses to the local address space of the target device and 2) translation from logical addresses of the requesting device to DMA target (PCIe bus) addresses, parts of the address space might not be mapped. Methods for accessing addresses that are currently not mapped to the PCIe bus are described in detail below. In some embodiments, a PCIe device such as a GPU, contains, in addition to a byte-addressable data storage, one or more logical functions. In such embodiments, accessing both the storage requires address translation when accessed by either the external PCIe device or by the internal logical functions. In these embodiments, the outcome of some of the translations may comprise a pointer to the local memory of the device, while other translations result in respective PCIe DMA transactions.

Each GPU 44 in FIG. 1 comprises a local GPU memory 60, which is sometimes referred to as a frame buffer. Memory 60 typically comprises a volatile memory such as a random access memory (RAM) having storage capacity on the order of several Gbytes. In some embodiments, GPU 44 comprises a mapping table 64 for translating between addresses in the internal address space that the GPU uses for accessing GPU memory 60, and respective physical addresses of fabric 40.

In some embodiments the GPU comprises two mapping tables. The first mapping table converts physical fabric addresses to respective addresses in the GPU memory. The second mapping table translates addresses for memory accesses done by the logical functions of the GPU into either addresses in the GPU memory or physical fabric addresses.

Each GPU 44 additionally comprises a PCI base address register (BAR) 70. BAR 70 defines an address range allocated to the GPU in the physical address space, i.e., the PCI BAR allocated to the device. At a given time, at least some of the physical addresses in the PCI BAR are associated with respective addresses in the internal GPU address space (e.g., via mapping table 64). In some embodiments, the entire GPU address space is mapped to a respective PCI BAR. In other embodiments, only a partial subset of the GPU address space is mapped to the PCI BAR. For example, the GPU address space may be larger than the maximal address space size supported by BAR 70. BARs in other PCIe devices, as will be described below, have similar functionality. Some parts of the BARs may be used for other purposes, such as, for example, for implementing a MMIO interface to the PCIe device logic.

SSD 48 comprises a memory controller 74, a nonvolatile memory 78 and a BAR 80. Memory controller 74 manages data storage in nonvolatile memory 78, which comprises, for example, a flash storage array. SSD controller 74 comprises a volatile memory 82 that serves, among other tasks, for managing the storage in nonvolatile memory 78 and as a buffer or cache memory. An SSD mapping table 84 translates between addresses in the internal address space used by SSD 48 and respective physical addresses in the allocated PCI BAR. BAR 80 holds the definition of the PCI BAR allocated to the SSD.

Although in the description that follows we refer to memory 82 as a volatile memory, in alternative embodiments other memory types can be used, such as, for example, a phase-change memory (PCM), which is a nonvolatile memory type.

In some embodiments, the SSD exposes volatile memory 82 to the PCIe bus using a 1:1 mapping, and therefore mapping table 84 is not required. In some embodiments, a remote device (e.g., a HCA) attempts to read data from the SSD that is not available in volatile memory 82. In such embodiments, the SSD fetches the missing data from array 78 to volatile memory 82, and the HCA updates its mapping table accordingly. In some embodiments, SSD mapping table 84 does not reside physically on the SSD, and its functionality is implemented by other elements outside the SSD (e.g., by the CPU).

As noted above, system 20 connects to communication network via HCA 52. In an embodiment, HCA 52 operates in accordance with a virtual address space. In other words, a remote HCA that communicates with PCIe devices of system 20 is unaware of the actual addresses used within the devices. CPU 32 and HCA 52 may share the same virtual address space or alternatively use different address spaces. HCA 52 comprises an HCA mapping table 88 for translating between the virtual address and physical addresses in the respective allocated PCI BAR.

Network 54 may comprise, for example, an InfiniBand network or an Ethernet network. In alternative embodiments, network 54 may comprise any suitable type of network having any suitable infrastructure and related protocols. The network infrastructure may comprise, for example, several interconnected subnets, each comprising switches, routers and/or any other suitable network element. Network 54 may comprise a local or a wide area network (WAN/LAN), a wireless network, or a combination of such networks. Additionally, the network may be a packet network such as IP, e.g., with TCP as the transport protocol, InfiniBand, or Ethernet network, delivering information at any suitable data rate.

As will be described in detail below, the architecture of system 20, together with the embodiments disclosed herein enable a PCIe device to directly access the local memory of another PCIe device over fabric 40. In some of the disclosed embodiments, when attempting to access an address of the local address space that is currently not mapped to the physical fabric, the device can map this address to the PCI BAR so as to make the address accessible.

As demonstrated in FIG. 1, direct data transfer between PCIe devices with dynamic mapping of device's local addresses to the physical address space can be used in various applications. Example such applications are listed herein:

- A network adapter that communicates with a peer network adapter over a communication network provides remote direct memory access (RDMA) over PCIe to the local memory of a PCIe device. Using the disclosed techniques may enhance the functionality supported by technologies such as GPUDirect and PeerDirect cited above. For example, in FIG. 1, GPU memory 60 of GPU1 can be accessed over the network via HCA 52.
- The previous example application, in which the PCIe device comprises a SSD. For example, RDMA methods as described, for example, in U.S. patent application Ser. Nos. 14/215,097 and 14/215,099, whose disclosures are incorporated herein by reference, can be adapted to access a SSD storage using the disclosed techniques. This approach may reduce the required number of PCIe to SSD transactions per storage command and therefore reduce the access latency of the SSD. In FIG. 1, the storage of SSD 48 can be remotely accessed in a direct manner via HCA 52.
- An application in which an SSD communicates with a GPU over PCIe to transfer data directly between the SSD memory and a GPU memory. For example, SSD 48 in FIG. 1 communicates over PCIe with GPU3.
- Direct data transfers over PCIe between the internal memories of two GPUs (e.g., GPU1 and GPU2 in FIG. 1).
- Direct data access over PCIe to a Field-Programmable Gate Array (FPGA) device that may comprise an internal memory.
- Two SSDs (such as, for example, SSD 48 of FIG. 1) whose memory controllers 74 handle direct data transfers, over PCIe, between their respective storage arrays 78.
- More generally, the disclosed techniques are applicable for any pair of PCIe devices, of which at least one device comprises an internal or directly attached memory, wherein the PCIe devices communicate with one another over a PCI or PCIe bus.

Exposing Device Addresses to PCI-E Bus

Figure 2A:
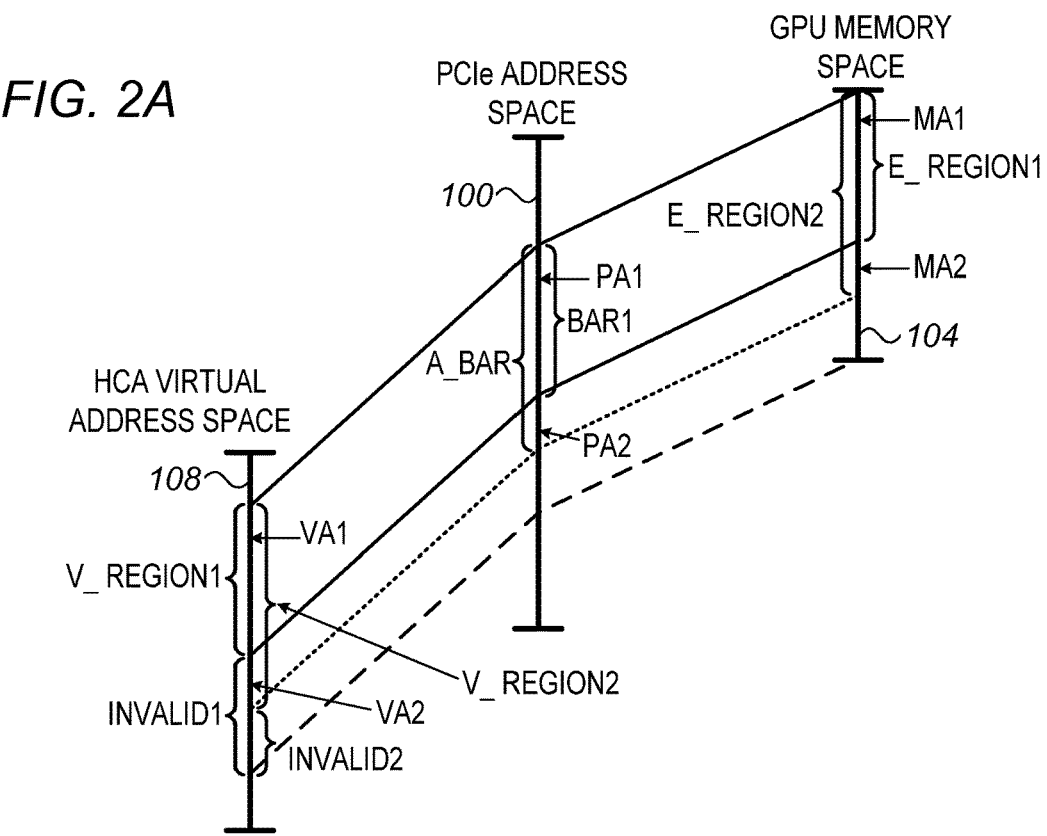
FIGS. 2A and 2B are diagrams that schematically illustrate techniques for dynamic mapping of local memory addresses for direct access via PCIe, in accordance with embodiments that are described herein.
Figure 2B:
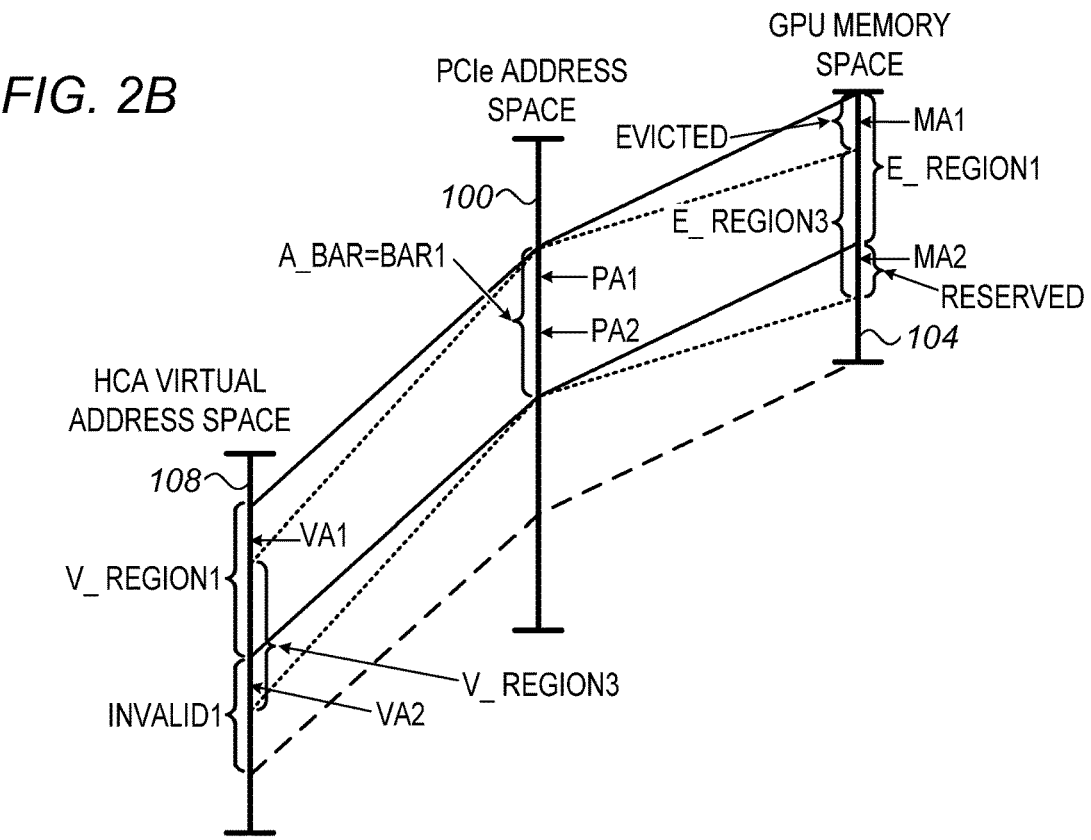

FIGS. 2A and 2B are diagrams that schematically illustrate techniques for dynamic mapping of local memory addresses for direct access via PCIe, in accordance with embodiments that are described herein. Each of FIGS. 2A and 2B depicts three address spaces as vertical line segments. The addresses in the present example relate to system 20 of FIG. 1, in which HCA 52 communicates with GPU1 over fabric bus 40.

In FIGS. 2A and 2B, an address space 100 comprises the physical address space of fabric 40. In addition, address spaces 104 and 108 comprise the internal address space used by GPU1 and the virtual address space used by HCA 52, respectively. In FIGS. 2A and 2B, we assume that the GPU first exposes to the PCIe bus an address range of memory 60 denoted E_REGION1. In the figures, MA1 and MA2 represent memory addresses of GPU memory 60, of which only MA1 is included within E_REGION1.

In some embodiments, CPU 32 allocates to the GPU an address range denoted A_BAR. In FIG. 2A a sub-region of A_BAR that is denoted BAR1 corresponds to E_REGION1. In some embodiments the CPU sets register BAR 70 in GPU1 in accordance with A_BAR, e.g., including the starting address and the size of A_BAR. Additionally, the CPU configures mapping table 64 in the GPU to translate between BAR1 addresses and respective E_REGION1 addresses. Note that in the present example, E_REGION1 is smaller than the full address space that GPU memory 60 supports.

In FIGS. 2A and 2B, an address range denoted V_REGION1 in the virtual address space of HCA 52 corresponds to E_REGION1 of the GPU address space. In some embodiments, HCA 52 translates between virtual addresses in V_REGION1 and physical addresses in BAR1 using HCA mapping table 88. For example, a virtual address VA1 in the virtual address space of HCA 52 corresponds to a physical address PA1 in BAR1, whereas PA1 corresponds to an address MA1 in E_REGION1.

In FIGS. 2A and 2B, the address range that is denoted INVALID1 comprises virtual addresses that have no corresponding addresses in the currently mapped region E_REGION1. In some embodiments, entries in HCA mapping table 88 that have no corresponding mapped addresses in BAR1, E_REGION1 or both are marked as invalid addresses. For example, with respect to E_REGION1, virtual address VA2 comprises an invalid address.

When HCA 52 initiates a direct data transfer to or from GPU memory 60 with reference to a virtual address that belongs to V_REGION1, such as address VA1, the HCA translates VA1 to respective physical address PA1, for example, using HCA mapping table 88. Since address PA1 is currently mapped to MA1 in the local address space of the GPU, MA1 can be accessed by translating PA1 to MA1, e.g., using mapping table 64.

When HCA 52 attempts executing a data transfer with respect to an invalid address such as VA2, HCA 52 may request CPU 32 to change the mapping between BAR1 and addresses in the local address space of the GPU by updating the related mapping tables so that VA2 becomes a valid address that has a corresponding mapped address MA2 in the GPU address space. Address range A_BAR of FIGS. 2A and 2B include a physical address PA2 that translates to VA2 in the virtual address space and to MA2 in the GPU address space. Thus, when PA2 belongs to A_BAR, the HCA can translate VA2 to PA2 and the GPU can translate PA2 to MA2. In an embodiment, CPU 32 updates mapping table 88 in the HCA and mapping table 64 in the GPU including mapping PA2 accordingly.

FIGS. 2A and 2B demonstrate two methods for updating the mapping tables. In FIG. 2A, A_BAR has an available range that includes PA2, and CPU 32 maps A_BAR to range E_REGION2 in the GPU address space that extends E_REGION1, and to a respective region V_REGION2 in the virtual address space that includes VA2.

In FIG. 2B, BAR1 maps the entire A_BAR region and there are no available physical addresses. In this example, CPU 32 re-maps BAR1 to E_REGION3 in the GPU address space including MA2 and to V_REGION3 in the HCA address space including VA2. Following the re-mapping, PA2 in BAR1 corresponds to MA2 in the GPU address space and to VA2 in the virtual address space. In the present example, CPU 32 re-maps BAR1 by exposing some space in addition to range E_REGION1 (i.e., denoted RESERVED in FIG. 2B), and evicting some space from E_REGION1 (i.e., denoted EVICTED in FIG. 2B). After the re-mapping, VA1 is marked as invalid. The CPU may select addresses for eviction using any suitable method. For example, the CPU may select to evict certain addresses using algorithms such as the least recently used (LRU) algorithm. Alternatively, the CPU may select addresses for eviction randomly.

In some embodiments, the CPU evicts addresses when extending E_REGION1 may exceed a predefined size limit of the PCI BAR. In other embodiments, the eviction can be performed independently from reserving additional pages. For example, the evicted addresses may correspond to pages of the local memory that were migrated, for example, to the system memory, SSD or another device. After eviction, e.g., due to page migration, the respective addresses in the related mapping tables should be marked as invalid.

In re-mapping BAR1, CPU 32 updates mapping tables 88 and 64 accordingly. In some embodiments, addresses that were evicted are marked as invalid addresses. Following the re-mapping, when accessing address MA2, HCA 52 translates VA2 to PA2 and the GPU translates PA2 to MA2. Since VA1 is outside V_REGION3, an attempt to access VA1 by the HCA will result in a page fault event, and trigger an update of the mapping tables.

The methods described in FIGS. 2A and 2B are given by way of example, and in alternative embodiments other suitable methods can also be used. For example, although in the figures, the various address ranges are contiguous, in other embodiments, the address range in at least one of the address spaces may be noncontiguous. As another example, although the methods of FIGS. 2A and 2B are described separately these methods may be used in a combined manner. For example, when re-mapping BAR1, the evicted and reserved regions may have different sizes.

Figure 3:
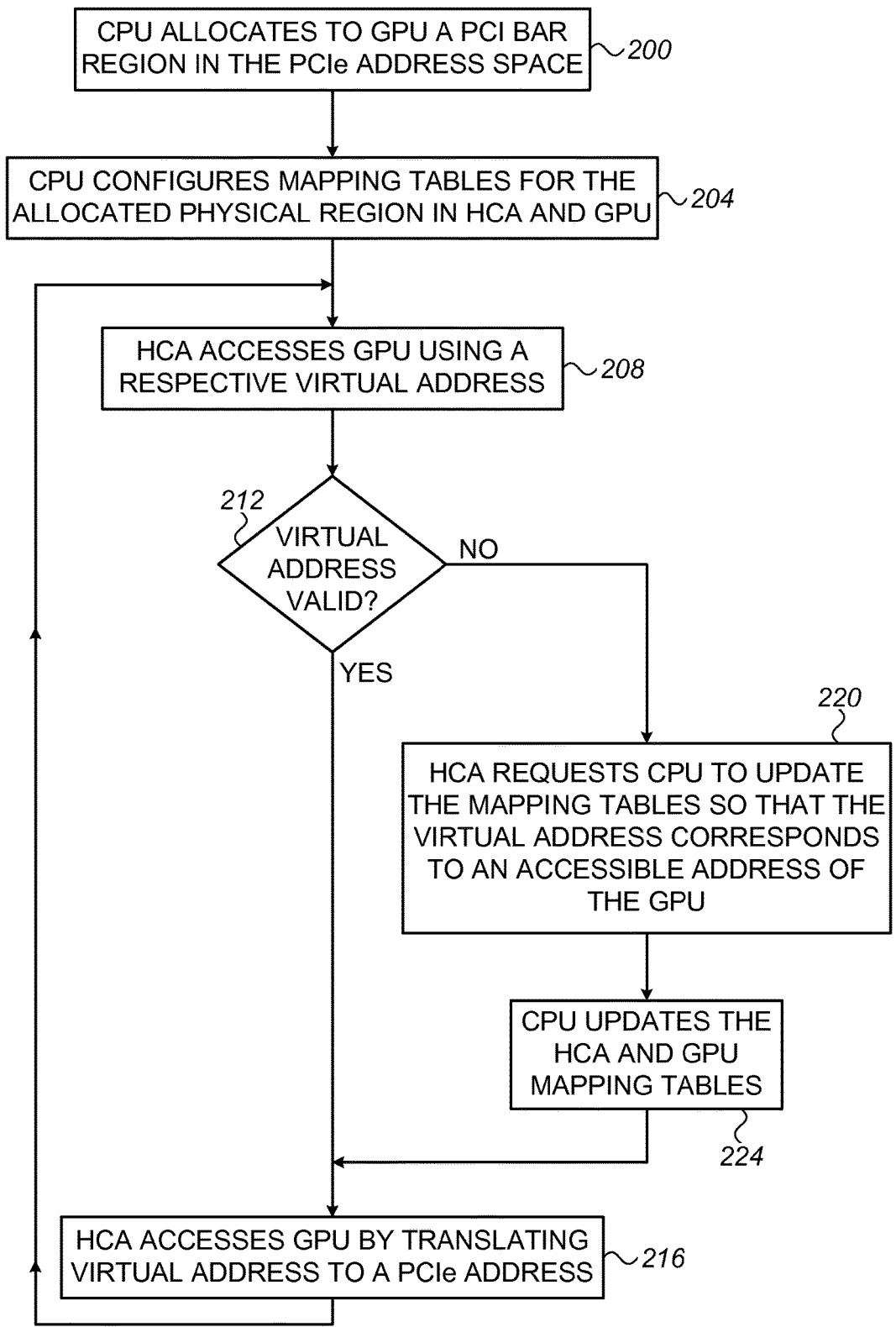
FIG. 3 is a flow chart that schematically illustrates a method for directly accessing the local memory of a device over PCIe, in accordance with an embodiment that is described herein.

FIG. 3 is a flow chart that schematically illustrates a method for directly accessing the local memory of a device over PCIe, in accordance with an embodiment that is described herein. In the method of FIG. 3 we assume a system similar to system 20 in FIG. 1, in which HCA 52 transfers data directly to and from GPU memory 60 of a GPU such as GPU1. The method begins with CPU 32 allocating a PCI BAR to GPU1, i.e., a range of physical addresses, at an allocation step 200. In some embodiments, the CPU allocates the PCI BAR in response to a GPU request to expose a respective range of local addresses to the PCIe bus.

At a mapping configuration step 204, the CPU configures mapping table 88 in the HCA and mapping table 64 in the GPU, in accordance with the region that the GPU requires to expose and the allocated PCI BAR. When configured, tables 88 and 64 can be used for translating between the allocated PCIe addresses and HCA virtual addresses or GPU memory addresses. In alternative embodiments, for example when using ATS, the GPU manages its mapping table without involving the CPU.

At a transfer initiation step 208, the HCA initiates a data transfer to or from the GPU memory at a given virtual address. At a validity checking step 212, the HCA checks whether the given virtual address is valid, i.e., has a corresponding physical address in the PCI BAR. When the virtual address at step 212 is found valid, the HCA accesses the GPU memory directly, at a GPU accessing step 216. The HCA translates the given virtual address to a respective physical address using, for example, mapping table 88. The GPU whose BAR 70 was configured at step 204 recognizes that the GPU memory is the destination of the data transfer and translates the physical address to the internal memory address to complete the transaction.

When at step 212 the given virtual address is found invalid, the HCA requests the CPU to update the mapping between the local addresses and respective physical addresses at an updating step 220. At a mapping updating step 224, the CPU updates mappings tables 88 and 64 using, for example, the methods described above. Following step 224, the method proceeds to step 216 in which the HCA accesses the GPU memory as described above.

When the HCA completes the direct access to GPU memory 60 at step 216 the method loops back to step 208 to apply subsequent direct access transactions.

Figure 4:
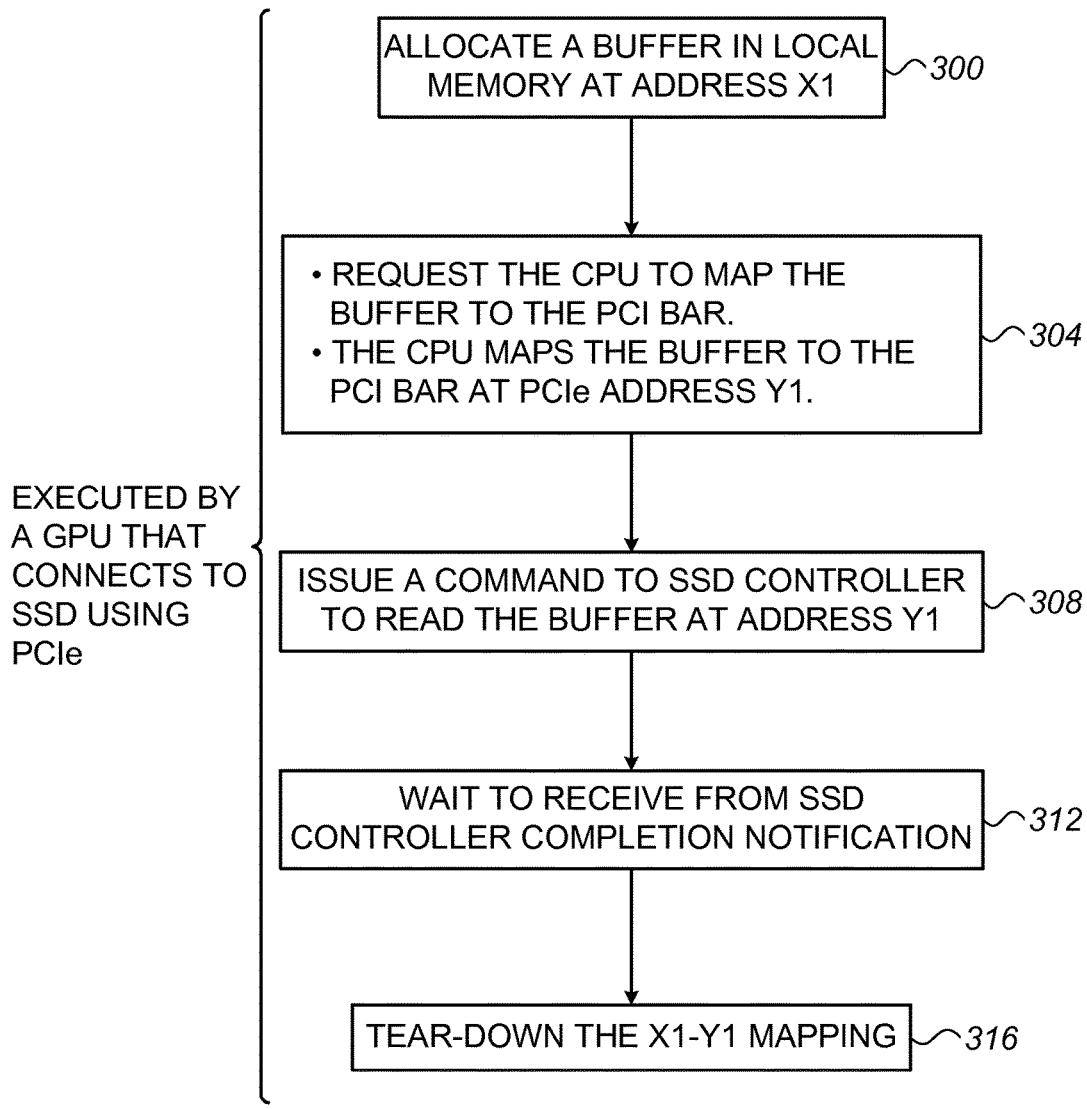
FIG. 4 is a flow chart that schematically illustrates a method for directly accessing the local memory of a device over PCIe, in accordance with another embodiment that is described herein.

FIG. 4 is a flow chart that schematically illustrates a method for directly accessing the local memory of a device over PCIe, in accordance with another embodiment that is described herein. The method of FIG. 4 is executed by GPU 44 whose memory 60 is the destination to be accessed by another PCIe device. In describing the method, we assume that a PCI BAR was allocated to the GPU before the method is executed.

The method begins with the GPU allocating a buffer in its local memory 60 at an address X1 of the internal address space of the GPU, at a buffer allocation step 300. In the present example, the allocated buffer is to be accessed by SSD controller 74. At a requesting step 304, the GPU maps the GPU memory buffer to the PCI BAR of the GPU, possibly by sending an explicit request to the CPU. In the present example, we assume that the CPU allocates a region in the PCI BAR starting at an address Y1. The CPU configures mapping table 64 of the GPU, as well as SSD mapping table 84, in accordance with the allocated range in the PCI BAR. In an embodiment, the request to the CPU includes the local memory address (i.e., X1) and the respective address in the volatile memory of the SSD, and therefore the configuration of mapping table 84 may be skipped.

At a command issuing step 308, the GPU issues a command to SSD 48, requesting SSD controller 74 to read the memory buffer at PCIe address Y1. The SSD controller then directly reads the GPU memory buffer by accessing respective addresses in the PCI BAR. The SSD translates the PCIe addresses to virtual addresses e.g., using SSD mapping table 84, and stores the read data in volatile memory 82. Methods for transferring data between volatile memory 82 and nonvolatile memory 78 are described further below.

At a waiting step 312, the GPU waits to receive from the SSD a notification that the SSD has completed reading the GPU buffer. When receiving the completion notification, the GPU proceeds to a tear-down step 316, in which the GPU requests the CPU to tear-down the mapping of the GPU memory buffer to the PCI BAR by removing respective entries in GPU mapping table 64 and SSD mapping table 84, and the method then terminates.

In a variant embodiment, the GPU mapping tables already include mappings of the GPU logical function's address space to point to the PCI BAR of the SSD. In this case, the GPU doesn't update the GPU local mapping, but rather performs a DMA write operation to the volatile memory of the SSD, followed by triggering an SSD operation to store the data in the flash array.

In another embodiment, the GPU may request from the CPU the physical address for accessing data that resides on the SSD. If the data is available in the volatile memory, the CPU updates the GPU with the appropriate mapping. If the data is not available in the volatile memory, the CPU allocates sufficient space in the volatile memory of the SSD, queues a read request on the SSD, and once the read request is completed, the CPU updates the GPU mapping table with mapping to the address in the volatile memory that contains the data.

In some embodiments, the method of FIG. 4 is executed wherein HCA 52 replaces SSD 48. In such embodiments, the GPU sends a command to the HCA to update mapping table 88 to include entries for mapping between virtual addresses and respective physical addresses in the region in the PCI BAR that was allocated to the memory buffer of the GPU.

Implementation Details

We now describe implementation details that can be used in several embodiments, including variants of the embodiments described above.

In some embodiments, a PCIe device (e.g., HCA 52) translates between its internal addresses and the PCIe bus addresses using an input/output memory mapping unit (IOMMU). In other embodiments, the PCIe device may perform address translation and resolution using a PCI address translation service (ATS). In some embodiments, tags such as process address space ID (PASID) tags, are used for specifying the addresses to be translated as belonging to the virtual address space of a specific process.

In some embodiments, address resolution may be implemented by each of the CPU, GPU, HCA or in combination of at least two of these elements. For example, the HCA may attempt to resolve a given address, and when concluding that the address in question resides in the GPU memory, the HCA requests the GPU to map the relevant addresses of the GPU memory to the PCI BAR, using direct device-to-device (i.e., HCA-to-GPU in this example) communication. For example, the HCA may send to the GPU an ATS-PRI (Address Translation Service-Page Request Interface) PCIe message. The GPU then provides to the HCA the entries to be added to the HCA mapping table.

As noted above, when re-mapping regions of the PCI BAR, some local addresses that are mapped to the PCI BAR may be evicted, e.g., due to PCI BAR space constraints. In alternative embodiments, eviction of local addresses is required for other reasons. For example, a storage controller such as SSD controller 74 may expose a memory buffer of volatile memory 82 by mapping the buffer to a respective region of the PCI BAR, but reclaim the buffer or part thereof when needed for other purposes. Such reclamation will trigger an invalidation of all respective mapping of the buffer in mapping tables of other PCIe devices, i.e., by marking the relevant virtual address space as invalid in the mapping table of relevant PCIe devices, such as HCA mapping table 88 (possibly using CPU coordination).

In some embodiments, the mapping tables are configured (e.g., by CPU 32) before another device actually attempts direct access to the local memory of the device. Using such a pre-fetching mechanism may reduce the accessing latency to the local memory.

In some embodiments, instead of updating the mapping between the PCI BAR and local addresses to include inaccessible addresses in the address space of a PCIe device (e.g., a GPU), the device may rearrange the data stored in its local memory so that the requested data is stored in addresses are currently mapped to the PCI BAR. Such implementation may require modifications to the code executed by the GPU, such as using pointers that are updated as data is moved. This technique is especially relevant for storage devices, such as NVMe or SSDs.

In some embodiments, the number of concurrent different physical address that a PCIe device supports is limited. Since over time dynamic mapping of local addresses to the PCI BARs tends to make the PCIe address space highly fragmented, the requested number of concurrent mappings per device may exceed the supported limit. In an embodiment, the mechanism that maps local addresses to respective PCI BARs in the PCIe address space employs defragmentation techniques. In some embodiments, such allocation mechanism may organize the mappings in a minimal number of contiguous ranges in the PCIe address space.

Direct Access to SSD

In an embodiment, CPU 32 or a peripheral device such as HCA 52 or GPU 44 communicate with SSD 48 over PCIe. As noted above, the embodiments disclosed above can be used for directly accessing volatile memory 82 whereas SSD controller 74 handles the SSD storage.

In an embodiment, the SSD manages its storage using a virtual or logical address space. Mapping table 84 translates between the addresses of volatile memory 82 and respective PCIe addresses. The SSD controller handles the associations between the virtual addresses and respective addresses of volatile memory 82, as well as mapping virtual addresses to respective locations used in storage array 78. In some embodiments, the physical addresses allocated to the SSD in the PCI BAR have a 1:1 mapping to respective addresses of the volatile memory of the SSD. In such embodiments, mapping table 84 may be omitted and address translation should be performed only at the peer device.

In some embodiments, the SSD controller caches data from array 78 in memory 82 for direct reading. Note that the size of memory 82 is typically much smaller than the size of flash storage array 78, and therefore the SSD controller can mirror only a partial subset of the data stored in storage array 78 into memory 82. Alternatively or additionally, memory 82 may store data independently of array 78 and expose addresses related to this data to the PCIe bus.

Volatile memory 82 serves as an intermediate buffer for DMA operations. Thus, when writing data to array 78, the data is first written to memory 82 using DMA, and then copied by the SSD controller to array 78. When reading data from array 78, SSD controller 74 first fetches the data from array 78 to volatile memory 82, and the data is then delivered from memory 82 to its destination using DMA. For example, in one embodiment the SSD controller signals to a remote device when the data is ready for direct reading from volatile memory 82, e.g., by indicating a respective address in the BAR from which to read. In response to the signaling, the remote device performs a DMA read operation, accordingly. In another embodiment, when the requested data is available in the volatile memory, the SSD controller may perform a DMA write operation toward the peer device. Fetching the data from the flash array may be skipped when the requested data already resides in memory 82. In some embodiments, SSD mapping table 84 includes an indication of whether the data stored at a given virtual address is available in memory 82.

In some embodiments, when reading data that is not currently available in volatile memory 82, the SSD controller fetches the missing data (e.g., a memory block that includes the missing data) from array 78 into volatile memory 82. In an embodiment, the peer device indicates to the SSD controller that the peer device attempts to access a logical address with reference to data that is currently not cached in the volatile memory 82 and therefore needs to be fetched from the nonvolatile array. The SSD controller then updaters SSD mapping table 84 accordingly, and informs the data requester that the data is now available for read. Alternatively or additionally, the mapping table in the peer device is also updated. In some embodiments, the SSD controller writes the fetched data in memory 82 over previously fetched data. In this case the SSD controller may write the data previously fetched back to array 87 and only then fetch the missing data.

Address Translation Services

A PCIe device may comprise a local memory, which the device accesses over an internal bus and not over the PCIe bus. To enable other devices to directly access the local memory, a respective address range in the PCIe address space, i.e., a PCI BAR is assigned to the device, as described above. A device that requires accessing the local memory of another device may comprise a mapping table that holds translations between addresses in the internal address space of the accessing device and respective addresses in the PCI BAR assigned to the device having the local memory.

An address in the internal address space of DEV_A is also referred to as an "untranslated address." An address in the address space of the PCIe bus that converts the untranslated address to a respective address in the relevant PCI BAR is also referred to as a "translated address." In the context of the present patent application and in the claims, the term "untranslated address" refers to a rage of one or more untranslated addresses. Similarly, the term "translated address" refers to a range of one or more translated addresses.

An entity in the system that provides address translation services (ATS) is referred to as a translation agent (TA). In the description that follows we describe example computing systems that include a memory management unit and a TA for providing address translation services. Example methods that implement various address translation related transactions are described further below.

Figure 5:
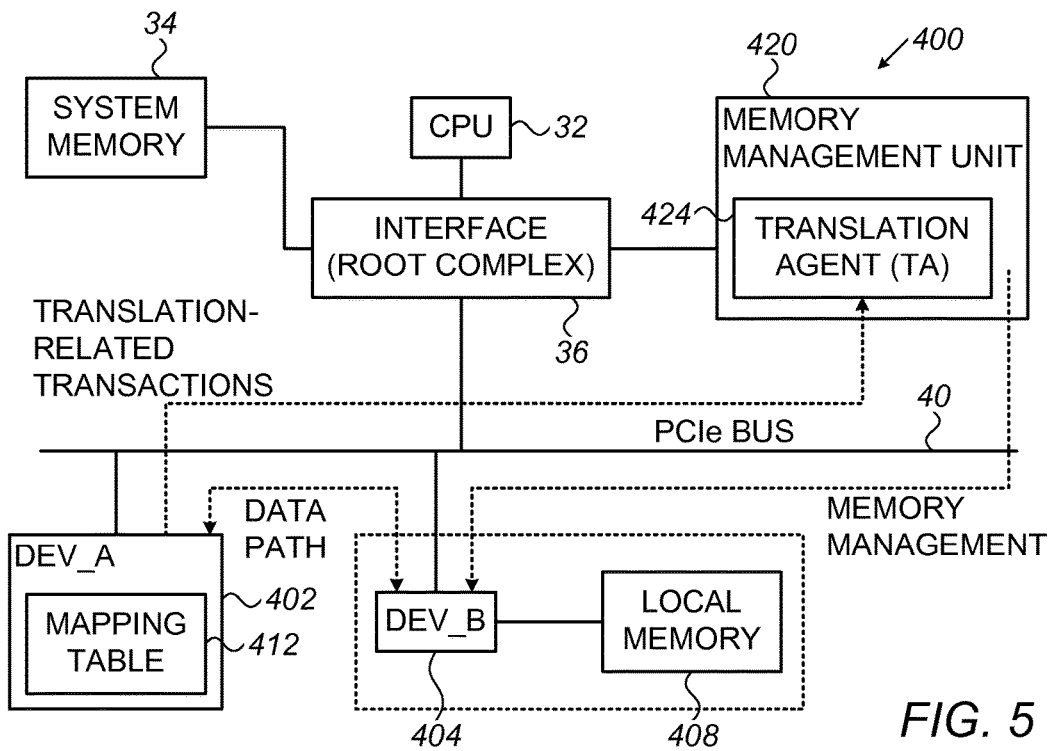
FIGS. 5 and 6 are block diagrams that schematically illustrates computing systems in which address translation services are provided to a device, for direct accessing of a local memory of another device over PCIe, in accordance with embodiments that are described herein.

FIG. 5 is a block diagram that schematically illustrates a computing system 400 in which address translation services are provided to a device, for direct accessing of a local memory of another device over PCIe, in accordance with an embodiment that is described herein.

Computing system 400 comprises CPU 32, system memory 34 and interface 36 that interconnects the CPU and system memory with one another and to fabric 40. In the present example, interface 36 comprises a system element denoted "Root Complex" (RC), as specified, for example, in the PCI Express® base specifications, cited above. Components connected directly to RC 36 (e.g., CPU 32), and devices connected to fabric 40, can access system memory 34 only via RC 36. In alternative embodiments, CPU 32, system memory 34 or both connect directly to the PCIe bus and not indirectly via the RC.

Computing system 400 comprises a PCIe device 402 denoted DEV_A, and a PCIe device 404 denoted DEV_B that comprises a local memory 408. DEV_A and DEV_B connect to fabric 40. DEV_A may comprise, for example, a network adapter such as HCA 52 of FIG. 1. DEV_B may comprise, for example, a GPU or a SSD such as GPUs 44 and SSD 48 of FIG. 1. Memory 408 of DEV_B is considered local in a sense that DEV_B cannot access memory 408 via the PICe bus but only via a local or internal connection. In some embodiments, local memory 408 is managed in page units that comprise a respective address range.

Local memory 408 may have any suitable size and can be of any suitable type or technology such as, for example, Flash memory. Local memory 408 may additionally comprise multiple memory devices of various sizes and technologies. Local memory 408 may be integrated within DEV_B or alternatively may comprise a separate module connected to DEV_B using any suitable local bus.

In the disclosed embodiments, system 400, and specifically DEV_A, DEV_B and fabric 40, are configured to enable DEV_A to directly access local memory 408 of DEV_B over the PCIe bus. In some embodiments, DEV_B exposes part (or all) of its local memory to the PCIe bus using a PCI BAR, as described above. The PCI BAR assigns a range of the PCIe address space to a respective address range of local memory 408 so that this address range can be accessed directly by one or more other devices such as DEV_A.

In the present example, DEV_A operates in accordance with an internal address space that is different from the PCIe address space. DEV_A comprises a mapping table 412 that translates between addresses of DEV_A address space and respective addresses of the PCIe address space. To access local memory 408 of DEV_B, DEV_A uses internal addresses that table 412 converts to respective PCIe addresses within the PCI BAR allocated to local memory 408.

System 400 further comprises a memory management unit 420 for managing local memory 408 of DEV_B. Among other tasks, unit 420 provides address translation services using an address translation agent (TA) 424. Unit 420 additionally provides information regarding access permissions to different address regions and implements mechanisms for memory isolation, e.g., in virtual environments. Unit 420 can be implemented as a separate module or can otherwise be built within RC 36. In the description that follows we assume that TA 424 performs both memory management tasks and address translation related tasks.

In system 400, TA 424 provides address translation services to DEV_A. Such services comprise, for example, converting addresses of the DEV_A address space to the PCIe address space, invalidating previously translated addresses, and handling page fault events. Example methods in which TA 424 provides DEV_A with address translation services are described in detail below.

In some embodiments, DEV_A communicates with TA 424 in accordance with an ATS protocol that defines the various transactions and message formatting used. In some embodiments, TA 424 implements an ATS protocol that conforms with, or is similar to, the ATS protocol of the PCIe standard extension cited above.

Messages sent from DEV_A to the TA, such as a request for address translation or a request for reserving a memory page in DEV_B, are delivered over the PCIe bus to RC 36, which delivers the request to TA 424. Messages sent from the TA to DEV_A, such as responds to DEV_A requests or invalidation requests, are delivered from the TA to RC 36, which sends the message over the PCIe bus to DEV_A.

Figure 6:
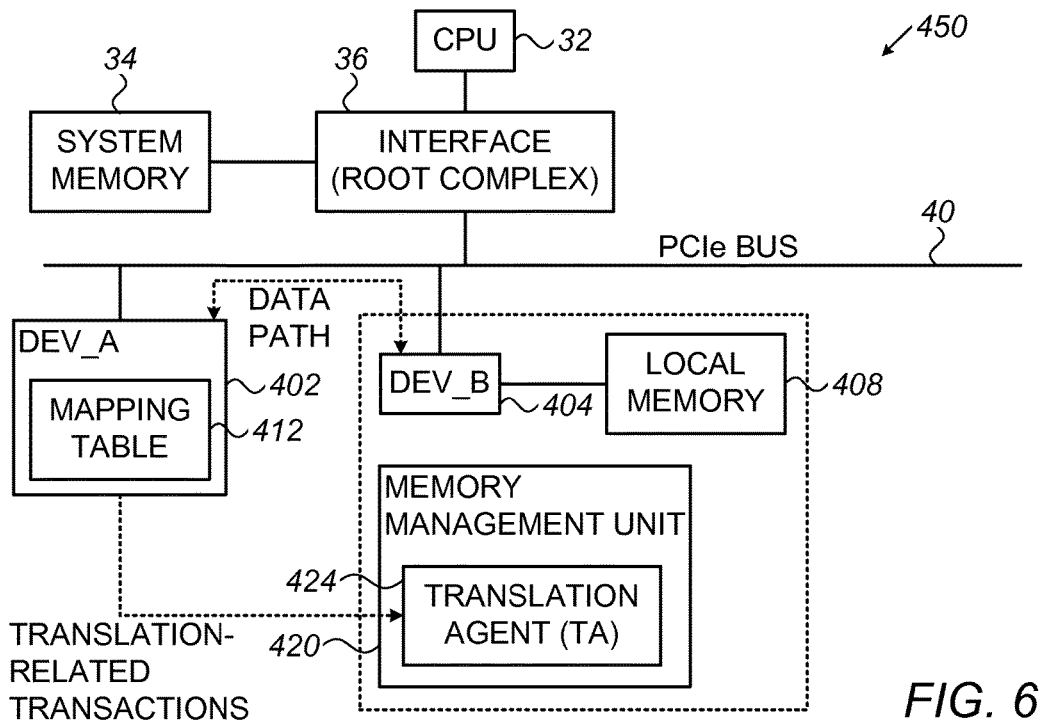

The system configurations of systems 400 and 450 in respective FIGS. 5 and 6 are given by way of example, and in alternative embodiments other system configurations can also be used. For example, although systems 400 and 450 comprise one PCIe device (DEV_A) that directly accesses the local memory of one other device (DEV_B), in alternative embodiments, a system may comprise multiple devices such as DEV_A, DEV_B, or both. Additionally, systems 400 and 450 may comprise multiple TAs such as TA 424. Although DEV_B in systems 400 and 450 comprises one local memory, in alternative embodiments DEV_B may comprise multiple separate local memories, wherein one or more of these local memories may be accessed directly over the PCIe bus.

For example, in an embodiment, DEV_A is configured to directly access the local memories of multiple respective devices such as DEV_B. In such embodiments, DEV_A may comprise multiple mapping tables, e.g., a mapping table per each respective local memory. In another example embodiment, multiple devices such as DEV_A are configured to access the local memory of a single device such as DEV_B. When the system comprises multiple devices such as DEV_A and multiple devices such as DEV_B, any suitable combination configuration of DEV_A devices accessing the local memories of DEV_B devices can also be used.

Although systems 400 and 450 comprise a single memory management unit and a single TA, in alternative embodiments, multiple memory management units and TAs can also be used. Each TA can connect to the PCIe bus via the RC or reside within a device having a local memory and connect to the PCIe bus via this device.

A TA that connects to the PCIe bus via the RC may manage multiple local memories that belong to one or more devices such as DEV_B, and provide translation services for multiple devices that require direct access to these local memories such as DEV_A. A TA that connects to the PCIe bus via a PCIe device, typically manages only the local memory of the device via which the TA connects to the PCIe bus.

FIG. 6 is a block diagram that schematically illustrates a computing system 450 in which address translation services are provided to a device, for direct accessing of a local memory of another device over PCIe, in accordance with an alternative embodiment that is described herein. The architecture of system 450 is similar to the architecture of system 400 and both systems comprise similar elements.

System 450 differs from system 400 mainly with regard to the position of memory management unit 420 and TA 424. In system 400 unit 420 and ATS 424 are positioned in or above RC 36 and can therefore manage the local memory of one or more devices such as DEV_B. In system 450, unit 420 and ATS 424 are positioned downstream to RC 36, within the domain of DEV_B and therefore typically manage only the local memory of DEV_B.

In system 450, messages communicated between DEV_A and TA 424 are delivered peer-to-peer with no involvement of RC 36 or CPU 32. Messages sent from DEV_A to the TA, e.g., a request for address translation, are delivered peer-to-peer from DEV_A over the PCIe bus to DEV_B, which delivers the messages to TA 424. Messages sent from the TA to DEV_A, such as responds to DEV_A requests, are delivered peer-to-peer from the TA to DEV_B, which sends the messages over the PCIe bus to DEV_A.

Routing messages between DEV_A and TA 424 over the PCIe bus can be carried out using mechanisms defined in the PCIe specifications, such as address-based or device ID routing. Routing methods for specific messages are described below. Next we describe several methods for implementing address translation related transactions.

Figure 7:
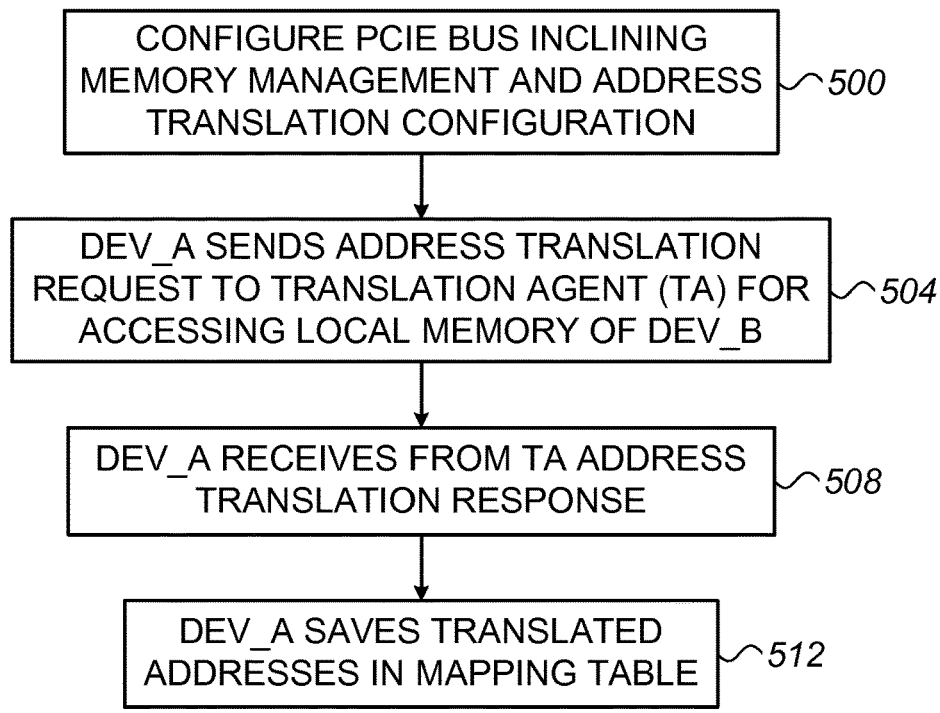
FIG. 7 is a flow chart that schematically illustrates a method for populating an address translation mapping table, in accordance with an embodiment that is described herein.

FIG. 7 is a flow chart that schematically illustrates a method for populating an address translation mapping table, in accordance with an embodiment that is described herein. The method begins with CPU 32 configuring the PCIe bus (or generally fabric 40) including RC 36, DEV_A and DEV_B, at an initialization step 500. The configuration defines the PCIe topology and hierarchy.

Specifically, the configuration identifies the way in which memory management unit 420 and TA 424 connect to the PCIe bus. When the TA connects to the PCIe bus via the RC as in system 400, the configuration enables DEV_A to communicate with TA 424 over the PCIe bus and via RC 36. When the TA connects to the PCIe bus via DEV_B, as in system 450, the configuration enables DEV_A to communicate with TA 424 peer-to-peer as described above.

At a translation requesting step 504, DEV_A sends an address translation request to TA 424. The request specifies an untranslated address or address range. Routing the request over the PCIe fabric can be based, for example, on the requestor ID or on the untranslated address range. The translation may involve translation between addresses defined in different domains, for example, domains used by the underlying operating system, by hypervisors in virtual environments and/or actual addresses of devices. The TA generates for the untranslated address a respective translated address within the PCIe BAR allocated to local memory 408 of DEV_B, and sends a translation response message that specifies the translated address to DEV_A. Routing the translation response message can be based, for example, on device ID to which the response is intended (i.e., DEV_A). Alternatively or additionally, routing the translation response can be based on address information and/or on routing information within a dedicated field in a header of the response message.

At a translation response reception step 508, DEV_A receives the translation response message sent by TA 424. DEV_A extracts the translated address from the response message and caches an association (or mapping) between the untranslated and translated addresses in mapping table 412 of DEV_A, at a caching step 512, and the method then terminates. Caching the mapping between the untranslated and translated addresses enables DEV_A to directly access local memory 408 of DEV_B in an efficient manner, in subsequent accessing attempts without involving CPU 32, RC 36 and TA 424.

The method of FIG. 7 can be carried out one or more times prior to DEV_A attempting to access DEV_B directly over fabric 40. Additionally, the method can be carried out for caching address translations to part of local memory 408 that is initially inaccessible, but becomes accessible at a later time, as will be described below.

Figure 8:
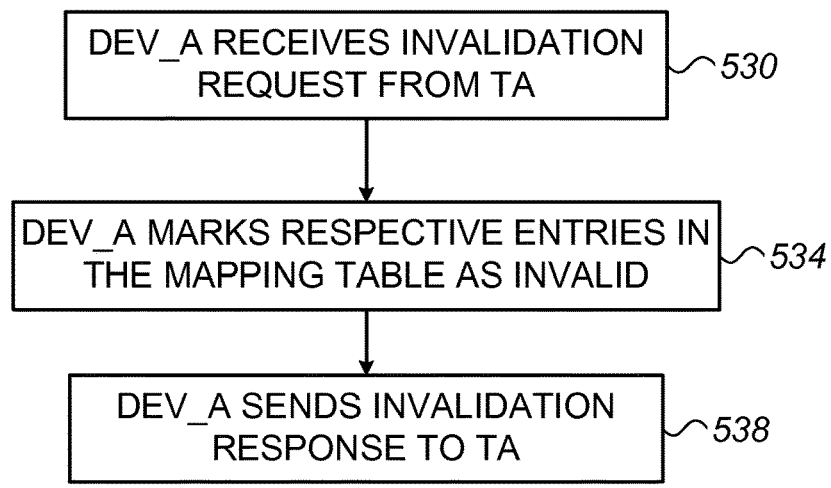
FIG. 8 is a flow chart that schematically illustrates a method for invalidation of an address translation entry in an address translation table, in accordance with an embodiment that is described herein.

FIG. 8 is a flow chart that schematically illustrates a method for invalidation of an address translation entry in an address translation table, in accordance with an embodiment that is described herein. The method begins with DEV_A receiving from TA 424 an invalidation request, at an invalidation request reception step 530. Routing the invalidation request over the PCIe bus can be based, for example, on the ID of DEV_A.

Invalidation of entries in mapping table 412 may be required in various situations. For example, in response to CPU 32 updating a translation table used by the TA, the TA may determine that one or more entries in mapping table 412 should be invalidated and send to DEV_A a respective invalidation request. As another example, when part (or all) of the data in local memory 408 of DEV_B is migrated, e.g., to system memory 34, the corresponding entries of mapping table 412 that are used for accessing this data in the local memory should be invalidated.

At a marking step 534, DEV_A marks entries of mapping table 412 that are identified by the invalidation request received, as invalid. After executing step 534, DEV_A is unable to access addresses in the local memory of DEV_B for which the respective translations in mapping table 412 were invalidated.

At an invalidation responding step 538, DEV_A sends an invalidation response message to TA 424. Routing the invalidation response message can be based, for example, on DEV_A ID, on the destination device ID (DEV_B or RC), or both. In some embodiments, DEV_A sends the invalidation response message only when all the PCIe transactions that depend on a respective invalidated entry of the mapping table have been completed. The invalidation response may comprise one or more massages. Following step 538 the method terminates.

Figure 9:
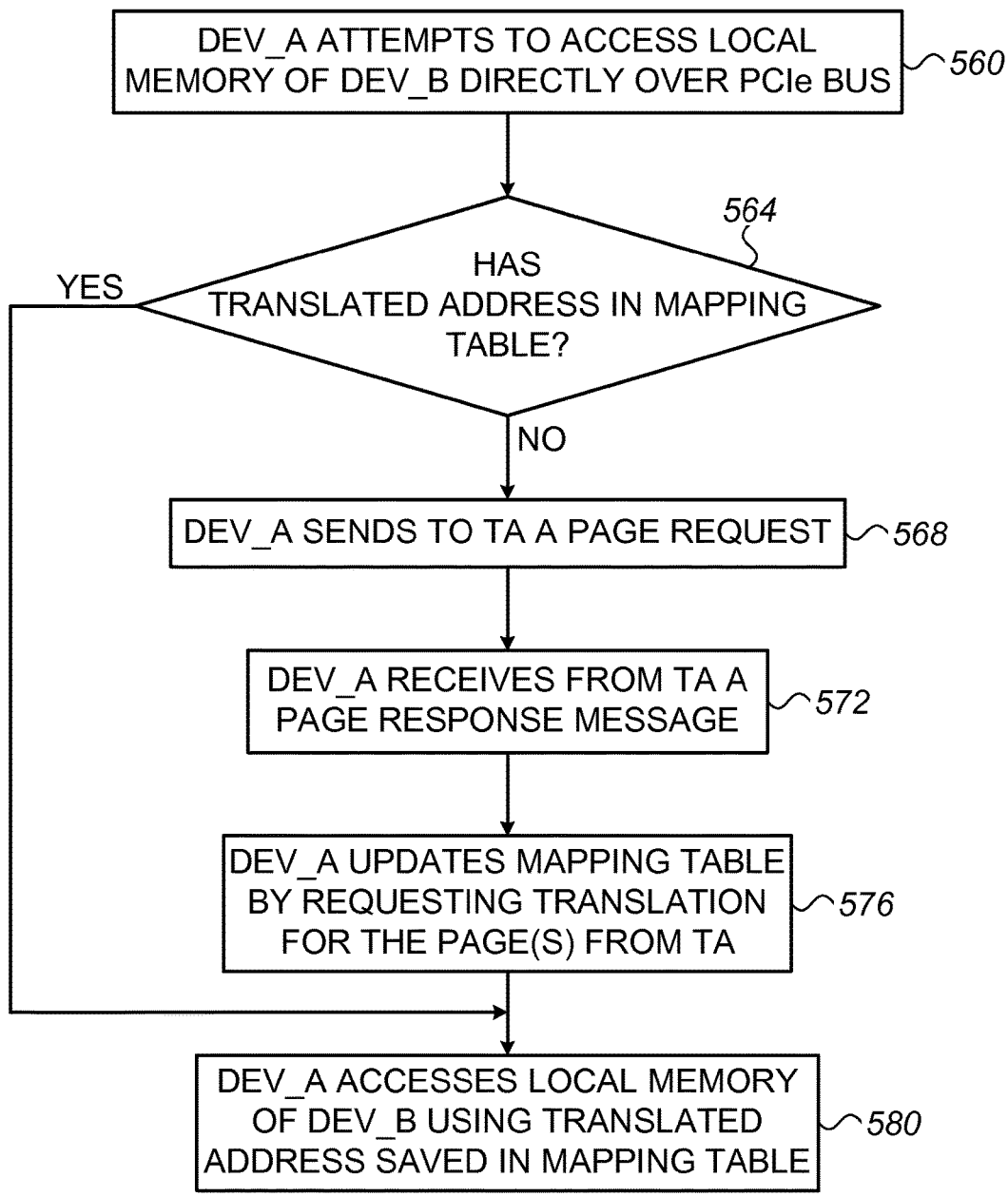
FIG. 9 is a flow chart that schematically illustrates a method for direct accessing a local memory over PCIe using an address translation table, in accordance with an embodiment that is described herein.

FIG. 9 is a flow chart that schematically illustrates a method for direct accessing a local memory over PCIe using an address translation table, in accordance with an embodiment that is described herein. In the present example, we assume that mapping table 412 in DEV_A was fully or partially populated, e.g., using the method of FIG. 7 above.

The method begins with DEV_A attempting to access local memory 424 of DEV_B over the PCIe bus, at a local memory accessing step 560. To access local memory 424, DEV_A uses an untranslated address that should be translated to a respective translated address in the PCI BAR allocated to DEV_B. At a translation availability checking step 564, DEV_A checks whether an address translation corresponding to the untranslated address is available in mapping table 412, and if so, retrieves the translated address from the mapping table, and uses the retrieved translated address to directly access the local memory of DEV_B, at a local memory accessing step 580.

If at step 564, the mapping table has no translated address that is associated with the untranslated address, DEV_A sends to TA 424 a page request message, at a page requesting step 568. Routing the page request message over the PCIe bus can be based, for example, on the requested address, the requestor (DEV_A) ID, or both. The page request message indicates to the TA that DEV_A requires access to local memory of DEV_B using an untranslated address that currently has no associated translated address in mapping table 412. In response to receiving the page request message, TA 424 reserves one or more memory pages in local memory 408 so that contains an address in the local memory corresponding to the untranslated address indicated in the page request message, and sends a respective page response message to DEV_A.

At a page response reception step 572, DEV_A receives the page response message sent by the TA. Routing the page response message over the PCIe bus can be based, for example, on the requested address, on DEV_A ID, or both.

At a table updating step 576 DEV_A requests an address translation for the reserved page(s) from the TA and updates mapping table 412, accordingly. In some embodiments, DEV_A executes step 576 by executing steps 504, 508 and 512 of the method of FIG. 7. DEV_A then proceeds to step 580 to directly access the local memory of DEV_B using the updated mapping table. Following step 580 the method terminates.

The system configuration of FIGS. 1, 5 and 6, including the various PCIe devices, TA configuration and fabric configurations, are exemplary configurations, which are shown purely for the sake of conceptual clarity. Any other suitable system, fabric, TA configuration, and/or peripheral device configuration can also be used. Elements that are not necessary for understanding the principles of the disclosed embodiments, such as various interfaces, addressing circuits, timing and sequencing circuits and debugging circuits, have been omitted from the figure for clarity.

In the exemplary configuration shown in FIGS. 1, 5 and 6, CPU 32, system memory 34 and interface 36 are mounted on a motherboard of the system, and PCIe devices GPUs 44, SSD 48, HCA 52 of FIG. 1, as well as DEV_A and DEV_B of FIGS. 5 and 6, are implemented as boards or Integrated Circuits (ICs) that connect to fabric 40 using, for example, expansion slots on the motherboard. In other embodiments, one or more of the PCIe devices are mounted on the motherboard itself. In yet other embodiments, PCIe devices may be integrated into the IC of another component, e.g., the CPU IC or the bus controller IC.

In some embodiments, each of PCIe devices GPUs 44, SSD 48 and HCA 52, as well as DEV_A and DEV_B, comprises a processing unit (not shown) that implements the functionality of the device including PCIe connectivity, and an interface for connecting to the PCIe bus. The different elements of GPUs 44, SSD 48, HCA 52, DEV_A and DEV_B may be implemented using any suitable hardware, such as in an Application-Specific Integrated Circuit (ASIC) or Field-Programmable Gate Array (FPGA). In some embodiments, some elements of GPUs 44, SSD 48, HCA 52, DEV_A and DEV_B can be implemented using software, or using a combination of hardware and software elements.

In some embodiments, the processing unit in GPU 44, SSD 48, HCA 52, DEV_A and/or DEV_B comprises a general-purpose processor, which is programmed in software to carry out some of the functions described herein. The software may be downloaded to the processor in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, the local memory of a PCIe device can be managed in various granularities. In an example embodiment, the local memory is organized in memory pages of, e.g., 64 Kbytes. Alternatively, other suitable granularity levels can also be used.

Although in the embodiments described above, allocating the PCI BAR and configuring the mapping tables is attributed to the CPU, this is not mandatory. In alternative embodiments these tasks can be carried out by a centralized element attached to the PCIe bus other than the CPU. Further alternatively, these tasks can be distributed between the CPU and involved devices.

Although the embodiments described above, refer mainly to accessing a local memory over PCIe, the disclosed techniques are applicable also in accessing functionalities other than memory or storage by mapping the device's local address space to the PCIe address space.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a system that includes a first peripheral device and a second peripheral device, both coupled via a fabric that operates in accordance with a fabric address space to a root-complex interface of the fabric, wherein the first and second peripheral devices communicate with one another over the fabric, and wherein the second peripheral device accesses a local memory via a local connection and not over the fabric, sending from the first peripheral device to a translation agent (TA) a translation request that specifies an untranslated address in an address space according to which the first peripheral device operates, for directly accessing the local memory of the second peripheral device;

receiving by the first peripheral device, from the TA, a translation response that specifies a respective translated address in the fabric address space, which the first peripheral device is to use instead of the untranslated address to access the local memory of the second peripheral device; and directly accessing the local memory of the second peripheral device by the first peripheral device over the fabric, without involving the root-complex interface, by converting the untranslated address to the translated address.

2. The method according to claim 1, wherein the local memory is separate from and independent of a system memory that is coupled, directly or indirectly, to the fabric.

3. The method according to claim 1, wherein sending the translation request, receiving the translation response and accessing the local memory by the first peripheral device are performed independently of a Central Processing Unit (CPU) that is coupled, directly or indirectly, to the fabric.

4. The method according to claim 1, wherein receiving the translation response comprises caching an association between the untranslated address and the respective translated address in a mapping table of the first peripheral device, and wherein accessing the local memory of the second peripheral device comprises retrieving the translated address from the mapping table.

5. The method according to claim 1, wherein the TA is implemented in the second peripheral device, and wherein sending the translation request and receiving the translation response are carried out by peer-to-peer communication between the first peripheral device and the second peripheral device.

6. The method according to claim 1, wherein the TA is implemented in a TA module that connects to the fabric via the root complex interface, wherein sending the translation request comprises routing the translation request from the first peripheral device over the fabric and via the root complex interface to the TA, and wherein receiving the translation response comprises routing the translation response via the root complex interface and over the fabric to the first peripheral device.

7. The method according to claim 4, and comprising sending, by the first peripheral device to the TA, a page request that indicates a given address that has no corresponding entry in the mapping table for translation, and receiving, by the first peripheral device, a respective page response sent by the TA, that indicates that an address in the local memory corresponding to the given address is accessible.

8. The method according to claim 4, and comprising receiving, by the first peripheral device, an invalidation request sent by the TA, indicating an invalid entry in the mapping table that should no longer be used for address translation, and eliminating the indicated entry from the mapping table.

9. The method according to claim 8, and comprising sending by the first peripheral device an invalidation response to the TA, indicating that all fabric transactions related to the eliminated entry have been completed.

10. An apparatus, comprising a first peripheral device and a second peripheral device that are both configured to connect via a fabric that operates in accordance with a fabric address space to a root-complex interface of the fabric, and to communicate with one another over the fabric, wherein the second peripheral device is configured to access a local memory via a local connection and not over the fabric, wherein the first peripheral device is configured to:

send to a translation agent (TA) a translation request that specifies an untranslated address in an address space according to which the first peripheral device operates, for directly accessing the local memory of the second peripheral device, receive from the TA a translation response that specifies a respective translated address in the fabric address space, which the first peripheral device is to use instead of the untranslated address to access the local memory of the second peripheral device, and directly access the local memory of the second peripheral device over the fabric, without involving the root-complex interface, by converting the untranslated address to the translated address.

11. The apparatus according to claim 10, wherein the local memory is separate from and independent of a system memory that is coupled, directly or indirectly, to the fabric.

12. The apparatus according to claim 10, wherein the first peripheral device is configured to send the translation request, to receive the translation response and to access the local memory independently of a Central Processing Unit (CPU) that is coupled, directly or indirectly, to the fabric.

13. The apparatus according to claim 10, wherein the first peripheral device is configured to cache an association between the untranslated address and the respective translated address in a mapping table of the first peripheral device, and to access the local memory by retrieving the translated address from the mapping table.

14. The apparatus according to claim 10, wherein the TA is implemented in the second peripheral device, and wherein the first peripheral device is configured to send the translation request and to receive the translation response by communicating peer-to-peer with the second peripheral device.

15. The apparatus according to claim 10, wherein the TA is implemented in a TA module that connects to the fabric via the root complex interface, wherein the first peripheral device is configured to send the translation request to the TA by routing the translation request over the fabric and via the root complex to the TA, and to receive the translation response from the TA by routing the translation response via the root complex and over the fabric to the first peripheral device.

16. The apparatus according to claim 13, wherein the first peripheral device is configured to send to the TA, a page request that indicates a given address that has no corresponding entry in the mapping table for translation, and to receive from the TA a respective page response indicating that an address in the local memory corresponding to the given address is accessible.

17. The apparatus according to claim 13, wherein the first peripheral device is configured to receive from the TA an invalidation request, indicating an invalid entry in the mapping table that should no longer be used for address translation, and to eliminate the indicated entry from the mapping table.

18. The apparatus according to claim 17, wherein the first peripheral device is configured to send to the TA an invalidation response, indicating that all fabric transactions related to the eliminated entry have been completed.

\* \* \* \* \*